Nov. 28, 1950     R. E. GLOS     2,531,679
VALVE
Filed May 20, 1947
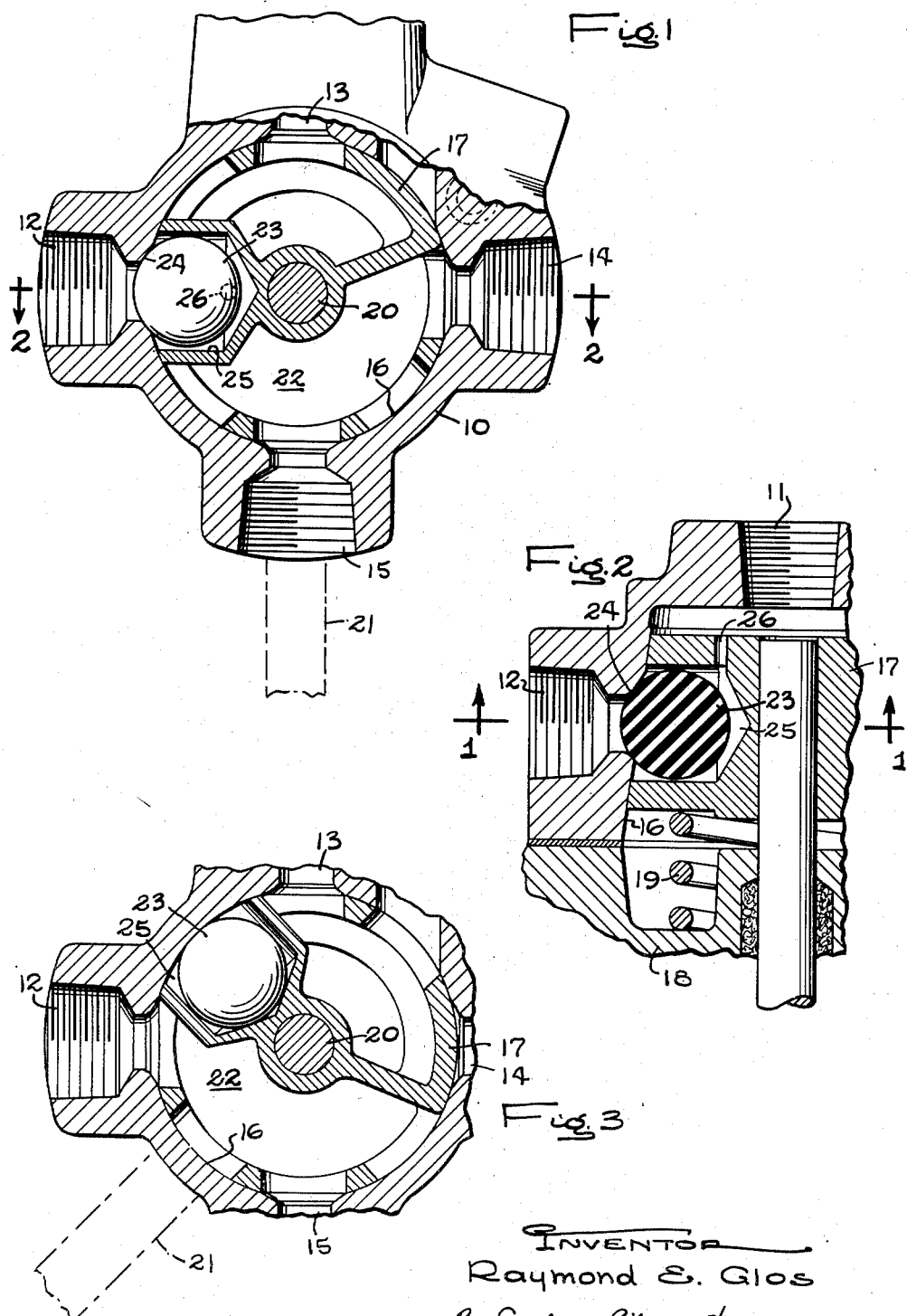
INVENTOR
Raymond E. Glos
By Carlson, Pitzner, Hubbard & Wolfe
ATTORNEY Patented Nov. 28, 1950

2,531,679

UNITED STATES PATENT OFFICE 2,531,679

VALVE

Raymond E. Glos, Freeport, Ill.

Application May 20, 1947, Serial No. 749,225

1 Claim. (Cl. 251—102)

This invention relates to a valve for controlling the flow of fluid and the primary object is to provide a novel type of seal which prevents the escape of fluid when the actuating member of the valve is in closed position.

A more detailed object is to provide a valve of the above character in which the seal is effected by a body of resilient material movable with the valve member into and out of operative position with respect to the fluid outlet of the valve.

Another object is to utilize the fluid pressure on the inlet side of the valve to increase the sealing pressure.

Other objects and advantages of the invention will become apparent from the following detailed description taken in connection with the accompanying drawings, in which Figure 1 is a sectional view taken along the line 1—1 of Fig. 2 of a valve embodying the novel features of the present invention.

Fig. 2 is a section taken along the line 2—2 of Fig. 1.

Fig. 3 is a view similar to Fig. 1 but showing the parts in a different position.

The improved sealing arrangement is shown in the drawings incorporated in a multiple type valve especially adapted for use in connection with water softeners. I do not intend by such disclosure to limit the invention in any way but aim to cover all modifications and alternative constructions and uses falling within the spirit and scope of the invention as expressed in the appended claim.

The valve includes a body 10 having a fluid inlet 11 in the bottom of the body, an outlet 12, and a plurality of other openings 13, 14 and 15 angularly spaced around the machined internal frusto-conical wall 16 of the body which is closed by a cover 18. Fluid delivered through the inlet 11 is directed to a selected one of the outlets according to the angular position of a frusto-conical member 17 urged into the body wall 16 by a compression spring 19 and having a stem 20 journaled in the cover 18 and rotatable as by turning an arm 21. If desired, means may be provided for lifting the valve member against the action of the spring 19 preparatory to turning the member to a new position.

When the valve member is turned to the position shown in Fig. 3, the outlet 12 and the opening 15 register with a recess 22 in the side of the member 17 permitting fluid delivered into the body through the opening 15 to flow through the recess 22 and out through the outlet 12. By turning the handle 21 to the position shown in Fig. 1, the outlet 12 is covered by the member 17.

The present invention aims to provide an effective seal for preventing the leakage of fluid around the valve member 17 and the escape thereof from the outlet 12 when the member is in closed position (Fig. 1). This is accomplished through the use of a body 23 of yieldable material such as rubber or suitable plastic carried by the valve member and adapted to be presented to a seat 24 around the outlet 12 automatically as an incident to turning of the member to the closed position shown in Fig. 1. The yieldable body 23 is received in an outwardly opening cavity 25 formed in the side of the valve member and preferably made slightly larger than the overall dimensions of the body 23 so that the latter fits relatively loosely in the cavity 25. Preferably, the sealing body is made spherical in shape so as to present a multiplicity of different surface areas adapted to fit the seat 24 and to avoid the necessity of positioning the body relative to the valve member.

Usually it is desirable to utilize the pressure of the fluid delivered through the inlet 11 to urge the body 23 toward the seat 24 and effect a tight seal therearound. To this end, a passage 26 is extended from the inner end of the cavity 25 outwardly through the valve member 17 to a space within the valve body 10 which space communicates at all times with the fluid inlet 11. The fluid pressure thus applied behind the sphere 23 urges the latter outwardly and presses it more firmly against the seat.

It will be seen from the foregoing that the outlet 12 is sealed effectually against the escape of fluid therefrom without the necessity of providing an accurate ground fit between the valve member 17 and the body wall 16 or without covering the member 17 with other sealing material which is likely to become worn in service use. As a result, the over-all cost of the valve as a whole is reduced appreciably while prolonging its trouble free service life.

I claim as my invention:

A fluid valve comprising a body having a recess therein with inlet and outlet ports communicating therewith, said outlet port being surrounded by a seat, a member fitting in said recess and movable relative to the body between a position in which said outlet port is covered and a second position in which said inlet and outlet ports are uncovered to establish communication therebetween through said recess, said member having a radially disposed cylindrical cavity therein larger in diameter than said port and said cavity being closed at its inner end and registering at its outer end with said port when said member is in said first-mentioned position, a sphere of resilient material slightly smaller in diameter than said cavity and fitting in the latter so as to act as a piston therein and move outwardly when pressure fluid is admitted to the closed end of the cavity, said sphere being engageable with said seat when said cavity is in register with said port and being adapted to turn freely within the cavity and roll onto and off from said seat when said member is turned to move the cavity out of register with the port, and means providing a passage between said inlet and said cavity continuously admitting pressure fluid into the cavity behind said sphere.

RAYMOND E. GLOS.

REFERENCES CITED

The following references are of record in the file of this patent:

UNITED STATES PATENTS

| Number | Name | Date |
|---|---|---|
| 232,230 | Barrow | Sept. 14, 1880 |
| 2,332,787 | Fleming | Oct. 26, 1943 |
| 2,418,404 | Greenlee | Apr. 1, 1947 |

FOREIGN PATENTS

| Number | Country | Date |
|---|---|---|
| 57,684 | Austria | Feb. 1913 |
| 734,204 | France | Oct. 18, 1932 |